US009075635B1

(12) United States Patent
Baird

(10) Patent No.: US 9,075,635 B1
(45) Date of Patent: Jul. 7, 2015

(54) SYSTEMS AND METHODS FOR MERGING VIRTUAL LAYERS

(75) Inventor: Bradley Baird, Orem, UT (US)

(73) Assignee: Symantec Corporation, Mountain View, CA (US)

(*) Notice: Subject to any disclaimer, the term of this patent is extended or adjusted under 35 U.S.C. 154(b) by 517 days.

(21) Appl. No.: 12/843,098

(22) Filed: Jul. 26, 2010

(51) Int. Cl.
*G06F 9/44* (2006.01)
*G06F 9/445* (2006.01)

(52) U.S. Cl.
CPC .................................. *G06F 9/44521* (2013.01)

(58) Field of Classification Search
None
See application file for complete search history.

(56) References Cited

U.S. PATENT DOCUMENTS

| 6,694,346 | B1* | 2/2004 | Aman et al. ................. 718/104 |
| 7,117,495 | B2 | 10/2006 | Blaser et al. |
| 7,162,724 | B2 | 1/2007 | Blaser et al. |
| 7,165,260 | B2 | 1/2007 | Blaser et al. |
| 7,461,086 | B1 | 12/2008 | Hurren et al. |
| 7,461,096 | B1 | 12/2008 | Hurren et al. |
| 7,496,931 | B2 | 2/2009 | Cook et al. |
| 7,512,977 | B2 | 3/2009 | Cook et al. |
| 7,519,963 | B1 | 4/2009 | Blaser et al. |
| 7,542,988 | B1 | 6/2009 | Cook et al. |
| 7,549,164 | B2 | 6/2009 | Cook et al. |
| 7,620,956 | B2 | 11/2009 | Cook et al. |
| 7,877,413 | B1 | 1/2011 | Cook et al. |
| 7,886,291 | B1 | 2/2011 | Jones et al. |
| 7,945,897 | B1 | 5/2011 | Cook |
| 7,970,789 | B1 | 6/2011 | Blaser et al. |
| 8,010,961 | B1 | 8/2011 | Cook et al. |
| 8,060,940 | B2 | 11/2011 | McCorkendale et al. |
| 8,108,346 | B1 | 1/2012 | Hurren et al. |
| 8,112,392 | B1 | 2/2012 | Bunnell et al. |
| 8,112,767 | B1 | 2/2012 | Cook |
| 8,209,408 | B1* | 6/2012 | Huang et al. .................. 709/223 |
| 8,261,254 | B2 | 9/2012 | Cook |
| 8,291,407 | B2 | 10/2012 | Greenwood et al. |
| 2003/0088604 | A1* | 5/2003 | Kuck et al. .......................... 709/1 |
| 2004/0221285 | A1* | 11/2004 | Donovan et al. ................... 718/1 |
| 2005/0268298 | A1* | 12/2005 | Hunt et al. .......................... 718/1 |
| 2006/0242634 | A1* | 10/2006 | Fleischer et al. .............. 717/148 |
| 2006/0271395 | A1* | 11/2006 | Harris et al. ....................... 705/1 |
| 2006/0271930 | A1* | 11/2006 | Letizi et al. ........................ 718/1 |
| 2007/0079307 | A1* | 4/2007 | Dhawan et al. .................... 718/1 |

(Continued)

OTHER PUBLICATIONS

Jared Blaser; Process Tracking Application Layered System; U.S. Appl. No. 11/324,571, filed Jan. 3, 2006.

(Continued)

*Primary Examiner* — H S Sough
*Assistant Examiner* — Umut Onat
(74) *Attorney, Agent, or Firm* — ALG Intellectual Property, LLC

(57) ABSTRACT

A method for merging virtual layers may include creating a virtual merger layer. The method may further include identifying a first virtual layer to be added to the virtual merger layer, the first virtual layer being programmed to execute within a process space of the first virtual layer. The method may also include identifying a second virtual layer to be added to the virtual merger layer, the second virtual layer being programmed to execute within a process space of the second virtual layer that is distinct from the process space of the first virtual layer. The method may also include linking the first and second virtual layers to the virtual merger layer such that when the virtual merger layer is activated, the first and second virtual layers execute within a process space of the virtual merger layer. Various other methods, systems, and computer-readable media are also disclosed.

20 Claims, 8 Drawing Sheets

(56) References Cited

U.S. PATENT DOCUMENTS

| | | | |
|---|---|---|---|
| 2007/0089111 A1* | 4/2007 | Robinson et al. | 718/1 |
| 2007/0180450 A1 | 8/2007 | Croft et al. | |
| 2011/0061045 A1 | 3/2011 | Phillips | |
| 2013/0212281 A1* | 8/2013 | Melander et al. | 709/226 |

OTHER PUBLICATIONS

Jordan Sanderson; Methods and Systems for Activating and Deactivating Virtualization Layers; U.S. Appl. No. 12/414,170; filed Mar. 30, 2009.

Karl Bunnell et al.; Methods and Systems for Merging Virtualization Sublayers; U.S. Appl. No. 12/396,969, filed Mar. 3, 2009.

Lance TeNgaio; Distributed Application Virtualization; U.S. Appl. No. 12/142,549, filed Jun. 19, 2008.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079; filed Jan. 31, 2008.

Cynthia Bringhurst; Systems and Methods for Virtualizing Software Associated with External Computer Hardware Devices; U.S. Appl. No. 12/554,413, filed Sep. 4, 2009.

Michael Spertus; Systems and Methods for Using Virtualization to Implement Information Rights Management; U.S. Appl. No. 12/715,213, filed Mar. 1, 2010.

Bradley Baird; Systems and Methods for Using Virtualization of Operating-System-Level Components to Facilitate Software Testing; U.S. Appl. No. 13/048,305, filed Mar. 15, 2011.

Randall R. Cook; Dynamic Insertion and Removal of Virtual Software Sub-Layers; U.S. Appl. 13/551,576, filed Jul. 17, 2012.

* cited by examiner

SYSTEMS AND METHODS FOR MERGING VIRTUAL LAYERS

BACKGROUND

Information Technology (IT) administrators may spend a substantial amount of time managing software applications. Managing software applications may include resolving application conflicts, repairing damaged applications, migrating to new versions of applications, installing applications, and patching applications. These tasks may be frustrating and time-consuming.

Application virtualization technologies may simplify many IT administration tasks. For example, application virtualization may allow an administrator to turn on or off a user's access to applications and data, which may reduce the time it takes to provide users with the resources they need. Application virtualization may also allow an administrator to reset broken applications to a known-good state without fear of damaging other applications. Application virtualization may ensure that each virtualized application has its own copy of DLL files that it would normally share with other applications. This eliminates conflicts that occur when two or more applications may require different versions of the same DLL, thereby rescuing administrators from a condition commonly referred to as "DLL Hell."

Application virtualization may allow different versions of the same application to peacefully coexist. This means that an administrator may keep older versions intact and available while testing new versions. Even after migrating to a new version, an administrator may quickly rollback to the previous version at any time.

Despite the numerous advantages of application virtualization, traditional virtualization technologies may not efficiently handle interactions between applications installed in different virtual locations. For example, a version of JAVA may be installed to one virtual layer, but an application requiring that version of JAVA may be installed in a different virtual layer. What is needed, therefore, is a more effective mechanism for handling virtualization of multiple applications.

SUMMARY

As will be described in greater detail below, the instant disclosure generally relates to systems and methods for merging virtual layers. In one example, the systems described herein may 1) create a virtual merger layer, 2) identify a first virtual layer to be added to the virtual merger layer, the first virtual layer being programmed to execute within a process space of the first virtual layer, 3) identify a second virtual layer to be added to the virtual merger layer, the second virtual layer being programmed to execute within a process space of the second virtual layer that is distinct from the process space of the first virtual layer, and 4) link the first and second virtual layers to the virtual merger layer such that when the virtual merger layer is activated, the first and second virtual layers execute within a process space of the virtual merger layer.

In one example, the systems described herein may redirect first and second file access attempts to different locations depending on whether the virtual merger layer is activated. When the virtual merger layer is not activated, the systems described herein may redirect a first file access request to the first virtual layer and redirect a second file access request to the second virtual layer. When the virtual merger layer is activated, the systems described herein may redirect the first file access request to the virtual merger layer and redirect the second file access request to the virtual merger layer.

In some embodiments, the systems described herein may activate the virtual merger layer. In such embodiments, activation of the virtual merger layer may trigger activation of the first and second virtual layers. Requests to modify or create files and/or settings may be directed to the virtual merger layer. For example, the systems described herein may identify an attempt to change a file or setting stored in the first virtual layer while the virtual merger layer is active. The systems described herein may further apply the change to the file or setting in the virtual merger layer instead of the first virtual layer. As another example, the systems described herein may identify an attempt to write a new file or setting to the first virtual layer while the virtual merger layer is active and may write the new file or setting to the virtual merger layer instead of the first virtual layer.

The process space of the first virtual layer may be independent of, and may be controlled separately from, the process space of the second virtual layer. For example, the process spaces of the first and second virtual layers may each execute within a process space that contains data, meta-data, and/or settings that may be set, edited, and/or or modified independently of other process spaces.

In one example, the first virtual layer may include files and/or settings of a first application installed to the first virtual layer. Similarly, the second virtual layer may include files and/or settings of a second application installed to the second virtual layer. In this example, the virtual merger layer may enable interaction between the first and second applications within the process space of the virtual merger layer.

The first and second virtual layers and the virtual merger layer may be stored on a computing system within an operating system environment of the computing system. The operating system environment of the computing system may include a process space that is distinct from the process space of the first virtual layer, the process space of the second virtual layer, and the process space of the virtual merger layer.

In one example, the systems described herein may retain files and/or settings stored in the first and second virtual layers in the first and second virtual layers when the first and second virtual layers are linked to the virtual merger layer. Thus, the virtual merger layer may remain empty when the first and second virtual layers are linked to the virtual merger layer.

In certain embodiments, a system for enabling virtual layers may include 1) a creation module programmed to create a virtual merger layer, 2) an identification module programmed to identify a first virtual layer to be added to the virtual merger layer, the first virtual layer being programmed to execute within a process space of the first virtual layer, and to identify a second virtual layer to be added to the virtual merger layer, the second virtual layer being programmed to execute within a process space of the second virtual layer that is distinct from the process space of the first virtual layer, 3) a linking module programmed to link the first and second virtual layers to the virtual merger layer such that when the virtual merger layer is activated, the first and second virtual layers execute within a process space of the virtual merger layer, and 4) one or more processors configured to execute at least one of the creation module, the identification module, and the linking module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
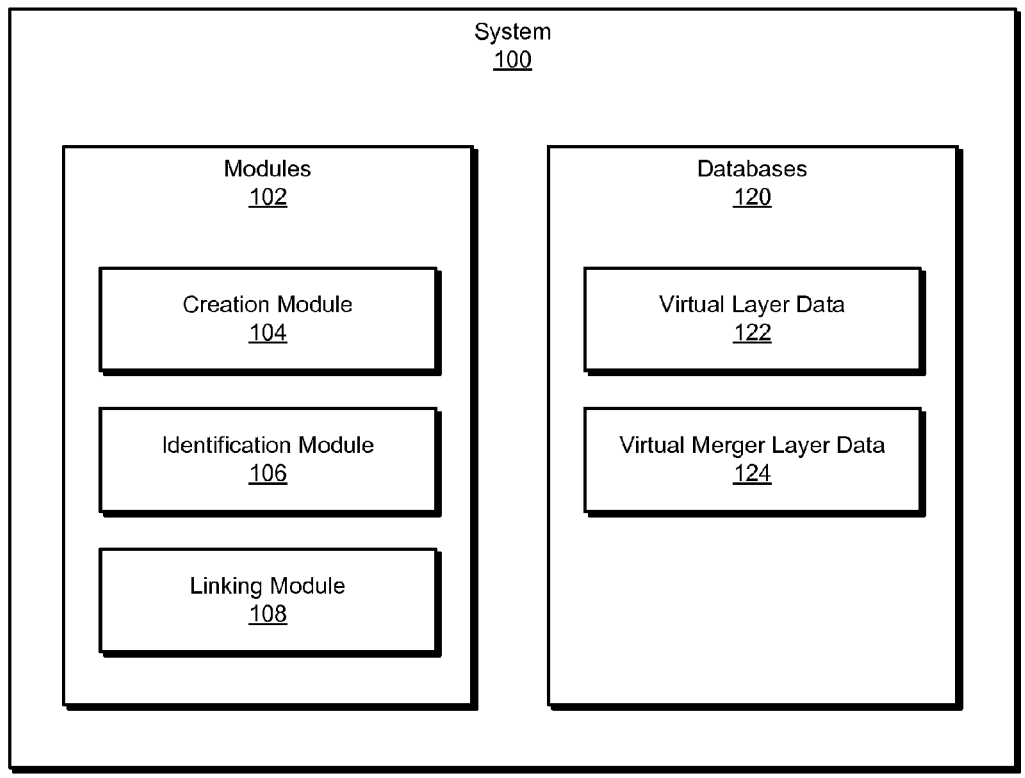
FIG. 1 is a block diagram of an exemplary system for merging virtual layers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for merging virtual layers. As will be explained in greater detail below, by linking two or more virtual layers to a virtual merger layer, virtual merger layers may facilitate interaction between applications installed in different virtual layers. In other words, virtual merger layers may enable administrators to run applications from different virtual layers in the same process space. Thus, virtual merger layers may allow applications to interact as though they are installed to the same virtual layer without risking potentially negative consequences of installing multiple applications to the same virtual layer. Embodiments of the instant disclosure may also provide various other features and advantages.

The following will provide, with reference to FIGS. 1-2, 5, and 6 detailed descriptions of exemplary systems for merging virtual layers. Detailed descriptions of corresponding computer-implemented methods will also be provided in connection with FIG. 3, and detailed descriptions of an exemplary user interface will be provided in connection with FIG. 4. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for merging virtual layers. As illustrated in this figure, exemplary system 100 may include one or more modules 102 for performing one or more tasks. For example, and as will be explained in greater detail below, exemplary system 100 may include creation module 104 programmed to create a virtual merger layer. Exemplary system 100 may also include an identification module 106 programmed to identify a first virtual layer to be added to the virtual merger layer. Identification module 106 may also be programmed to identify a second virtual layer to be added to the virtual merger layer.

In addition, and as will be described in greater detail below, exemplary system 100 may include linking module 108 programmed to link the first and second virtual layers to the virtual merger layer such that when the virtual merger layer is activated, the first and second virtual layers execute within a process space of the virtual merger layer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as databases 120. In one example, databases 120 may include virtual layer data 122 and virtual merger layer data 124. Databases 120 may represent portions of a single database or computing device or a plurality of databases or computing devices. For example, databases 120 may represent a portion of server 206 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Figure 2:
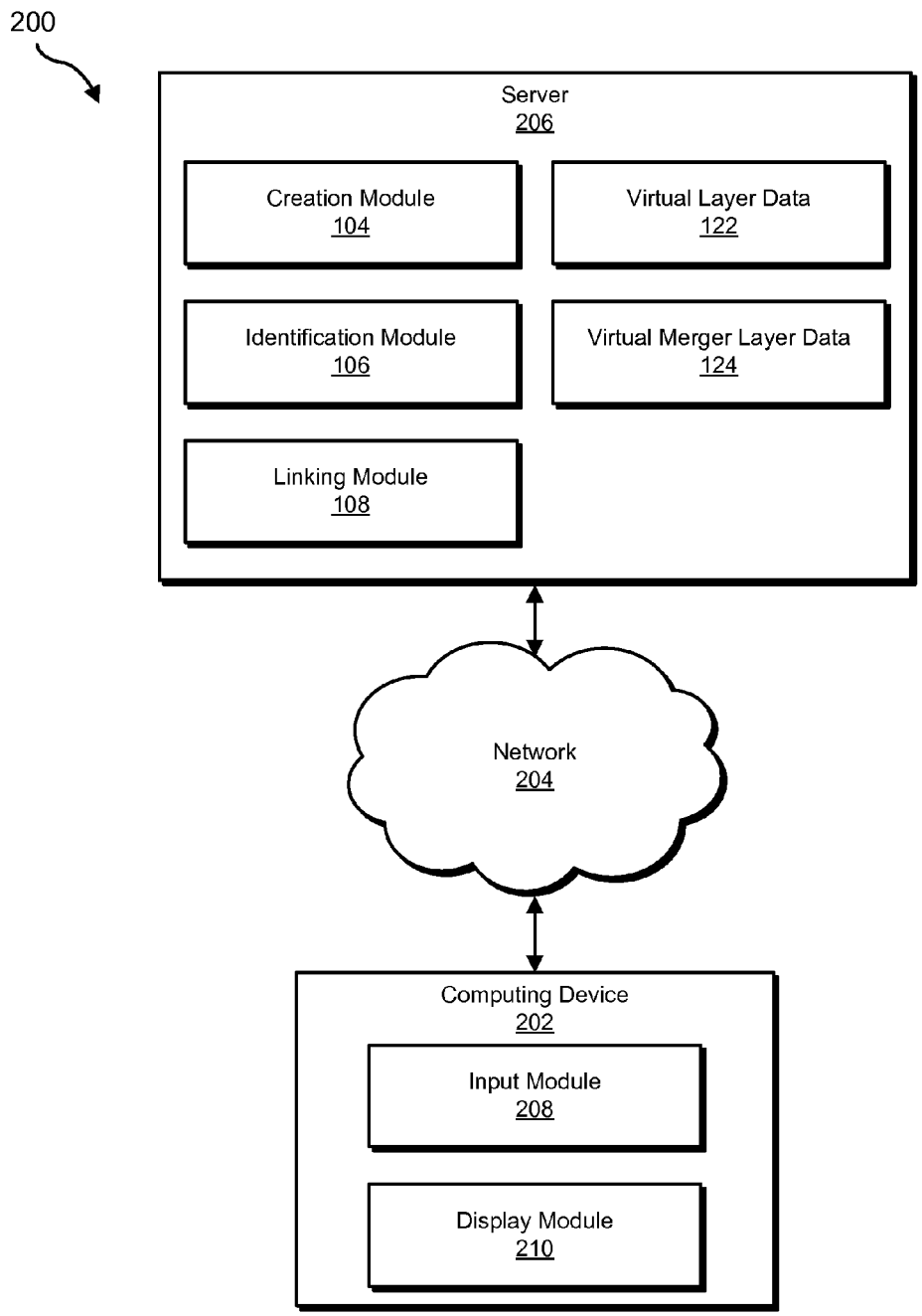
FIG. 2 is a block diagram of another exemplary system for merging virtual layers.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a server 206 via a network 204. In one embodiment, and as will be described in greater detail below, computing device 202 may be programmed to perform input and output operations using an input module 208 and a display module 210. Thus, computing device 202 may provide an interface to server 206, which may include multiple virtual layers. Alternatively, embodiments of the instant disclosure may be implemented on a single device or system, with input module 208 and/or display module 210 located on the same device as virtual merger layer 124.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of communicating with computing device 202 to cooperatively perform any of the methods for enabling virtual layers described herein. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
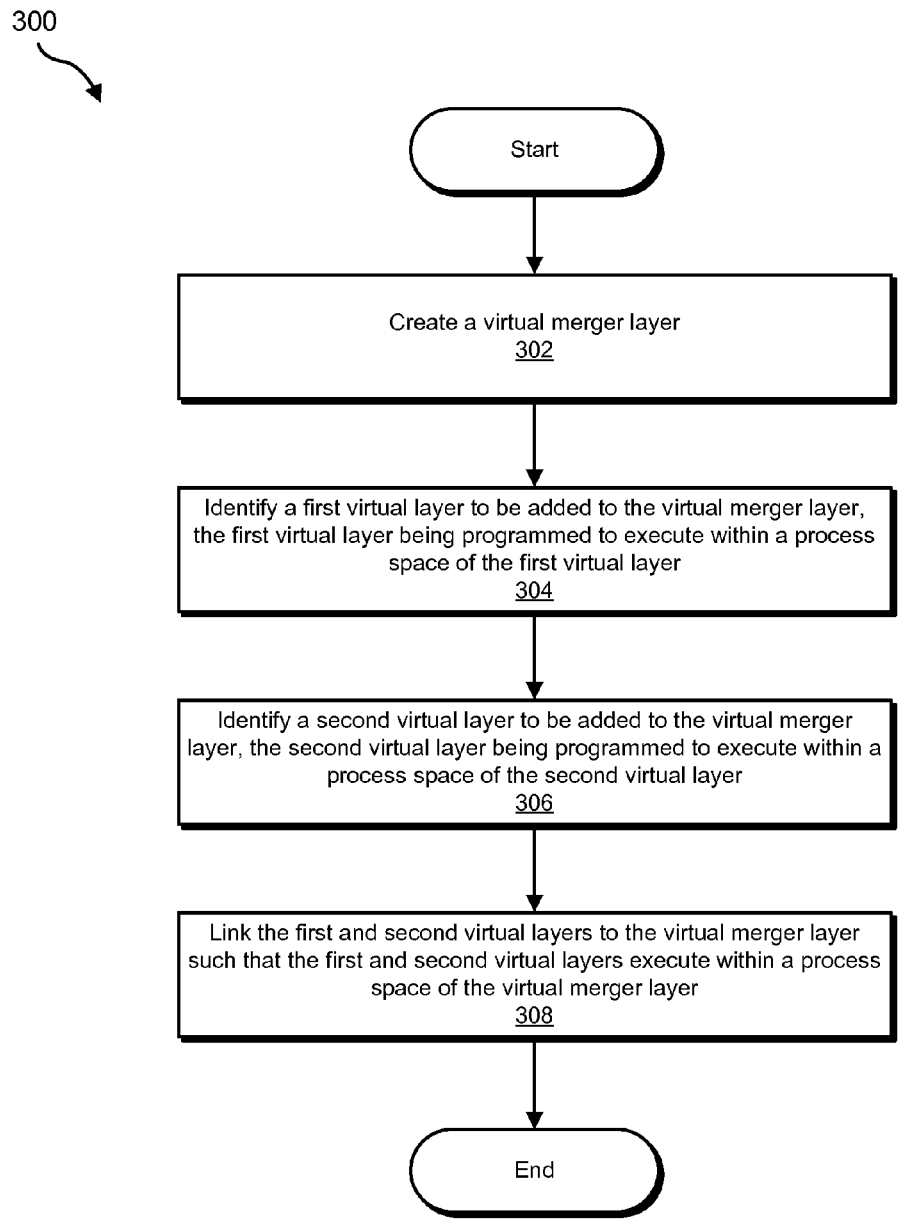
FIG. 3 is a flow diagram of an exemplary method for merging virtual layers.

FIG. 3 is a flow diagram of an exemplary computer-implemented method 300 for merging virtual layers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the exemplary systems disclosed herein may create a virtual merger layer. For example, creation module 104 may create a virtual merger layer by designating a space for writing new data in the virtual merger layer.

Creation module 104 may create the virtual merger layer in a variety of contexts using one or more of a variety of techniques. The following discussion of FIG. 4 elaborates on an exemplary embodiment for creating a virtual merger layer in accordance with step 302.

Figure 4:
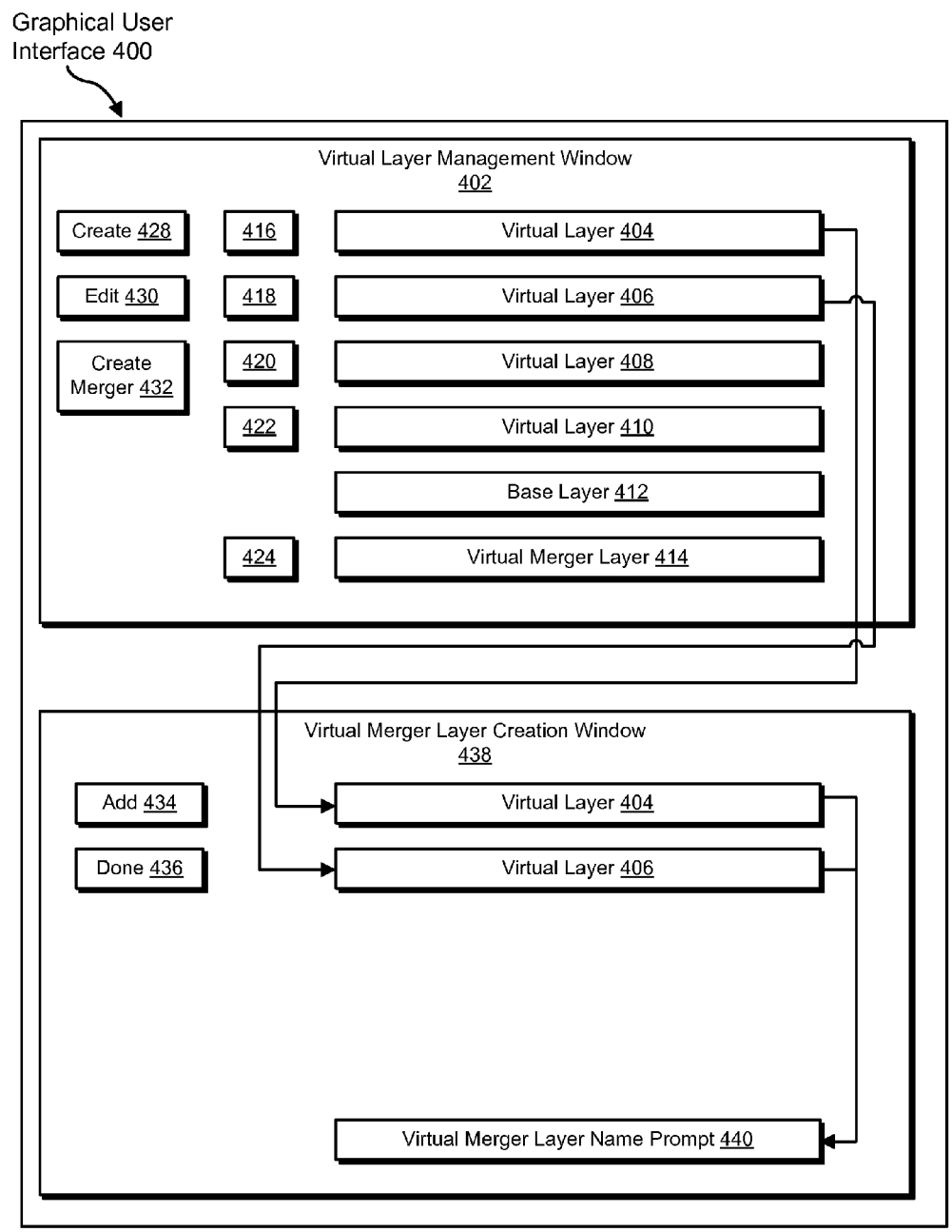
FIG. 4 is a block diagram of an exemplary graphical user interface for linking virtual layers.

FIG. 4 illustrates an exemplary graphical user interface (GUI) 400 for creating and managing virtual merger layers. As shown in FIG. 4, GUI 400 may include virtual layer management window 402 and virtual merger layer creation window 438. Virtual layer management window 402 includes a number of representations 404-414 of virtual and other layers in a computing system, such as computing device 202 and/or server 206. Specifically, virtual layer management window 402 includes a virtual layer 404, a virtual layer 406, a virtual layer 408, a virtual layer 410, a base layer 412, and a virtual merger layer 414. Each of virtual layers 404-410 and virtual merger layer 414 may be associated with a corresponding activation toggle 416-424. GUI 400 is configured such that when a user selects one of activation toggles 416-424, the corresponding layer from the layers 404-410 and 414 is activated or deactivated accordingly.

Virtual layer management window 402 also includes create button 428, edit button 430, and create merger button 432. By selecting create button 428, a user may create a new virtual layer, such as virtual layers 404-410. Creation module 104 may create a virtual layer by designating a separate space for writing new data to that virtual layer.

Additionally or alternatively, creation module 104 may create a virtual layer in part by designating a name for the virtual layer (e.g., "virtual layer 4" or any other name). Creation module 104 may also designate rules for behavior of the virtual layer, including rules regarding file request redirection. For example, creation module 104 may establish rules regarding file request redirection by modifying the virtualization settings that are associated with a virtual layer.

Figure 5:
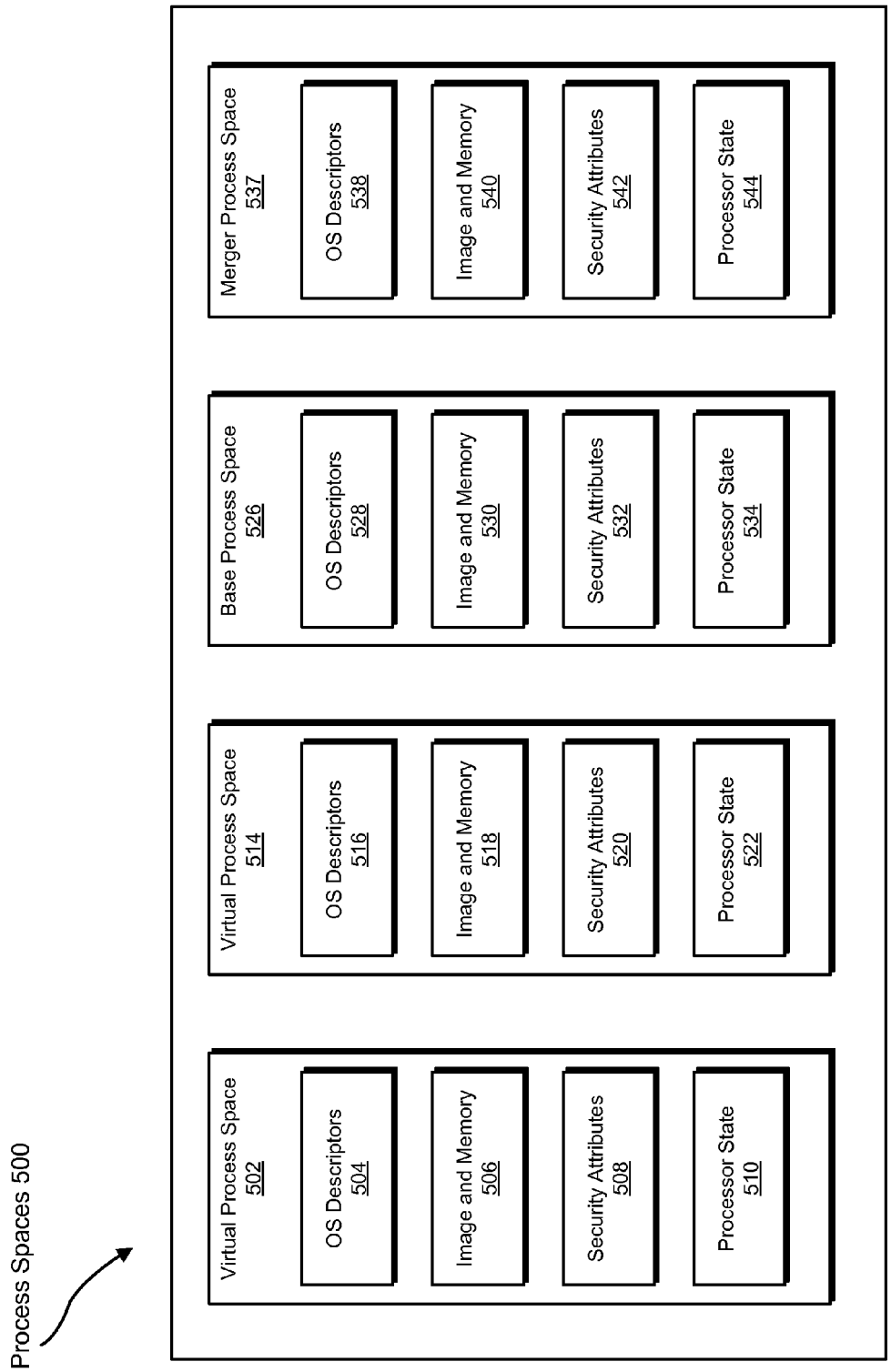
FIG. 5 is a block diagram of exemplary process spaces.

As will be discussed in greater detail below, each virtual layer and virtual merger layer may execute within its own process space. The following discussion regarding FIG. 5 provides examples of process spaces that correspond to virtual layers. FIG. 5 is a block diagram illustrating exemplary process spaces 500. Process spaces 500 may include virtual process spaces 502 and 514 of first and second virtual layers, respectively. Process spaces 500 may also include a base process space 526 of a base layer (e.g., a base file system of an operating system). Lastly, process spaces 500 may include a merger process space 537 of a virtual merger layer, as discussed more below.

In one example, merger process space 537 may be a process space of virtual merger layer 414, virtual process space 502 may be a process space of virtual layer 408, virtual process space 514 may be a process space of virtual layer 410, and base process space 526 may be a process space of a host operating system environment. Virtual layers 404 and 406 may be linked to virtual merger layer 414 and may execute within merger process space 537.

Each of the process spaces 502, 514, 526, and 537 may include Operating System (OS) descriptors, image and memory, security attributes, processor state, and/or any other suitable resource. As shown, virtual process space 502 may include OS descriptors 504, image and memory 506, security attributes 508, and a processor state 510. Similarly, virtual process space 514 may include OS descriptors 516, image and memory 518, security attributes 520, and a processor state 522. Base process space 526 may include OS descriptors 528, image and memory 530, security attributes 532, and a processor state 534. Merger process space 537 may include OS descriptors 538, image and memory 540, security attributes 542, and a processor state 544.

Operating system descriptors may be descriptors of resources that are allocated to a process, such as file descriptors (UNIX terminology) or handles (WINDOWS), and data sources and sinks. An image portion of a process space may include an image of the executable machine code associated with an application. Memory of a process space may typically include some region of virtual memory, and may include the executable code, process-specific data (input and output), a call stack (to keep track of active subroutines and/or other events), and a heap to hold intermediate computation data generated during run time. Security attributes may include the process owner and the set of permissions (allowable operations) for the process. Processor state, or context, may include the contents of registered and physical memory addressing. The operating system may hold some, most, or all of the above information about active processes in data structures called process control blocks.

A process space may include any set of processes that share of one or more of the resources shown in any of the process spaces 502, 514, 526, and 537 shown in FIG. 5. For example, processes that share security attributes and/or virtualization settings may be considered to share a process space. More generally, for the purposes of this disclosure, the term "process space" may include a collection of related processes that are independent of, and can be controlled separately from, all other processes on a system.

The phrase "process space" may also refer to a file system filter driver's view of a set of processes. For example, a file system filter driver may direct calls from a set of processes to a layer (e.g., a base layer, a virtual layer, etc.). This set of processes may be referred to as a process space.

The process spaces show in FIG. 5 may not all exist or be present on a system at the same time. For example, virtual process space 502 may be present on a system when a first virtual layer is active, and virtual process space 514 may be present on the system when a second virtual layer is active. However, when the first and second virtual layers are not active, virtual process spaces 502 and 514 may not be present on the system or may not be in an active state on the system. In other words, a process space of layer may be an execution environment that is present on a system when the layer is active (i.e., executing within the process space) but not present when the layer is inactive. Thus, merger process space 537 may be present on the system when a virtual merger layer is active, but may not be present on the system when the virtual merger layer is not active.

Figure 6:
FIG. 6 is a block diagram illustrating examples of file redirection.

In embodiments of the instant disclosure, a file system filter driver may implement one or more rules to redirect file system calls to virtual layers. FIG. 6 is a block diagram 600 illustrating a system for directing a file request. The following discussion of FIG. 6 explains how rules for file system request redirection may be established for a virtual layer by creation module 104. FIG. 6 illustrates a diagram of how a file request may be modified, or remain unmodified, according to whether one or more virtual layers are activated. Specifically, FIG. 6 illustrates how a request 602 for a particular file ("c:\folder1\file.txt") may be modified or remain unmodified depending on whether a virtual layer 614 and/or virtual merger layer 616 are activated. In the case that neither virtual layer 614 nor virtual merger layer 616 are activated, then file request 602 may remain unmodified, as shown in file request 604. In that case, file request 602 may proceed directly, and without modification, to base layer 612. Specifically, file request 604 is directed to c:\folder1\, which is part of base layer 612.

In contrast, when virtual layer 614 is activated, then file request 602 may be modified so that the file "file.txt" is retrieved from the virtual layer 614 instead of base layer 612. Specifically, file request 602 may be modified so that the request no longer attempts to access c:\folder1\, but rather attempts to access c:\folder1_VL\, which may be a part of virtual layer 614. For example, a filter driver within the particular computing system, such as server 206 and/or computing device 202, may intercept the original file request 602. The filter driver may modify file request 602 based on a determination that a virtual layer, such as virtual layer 614, is activated. In the case that the virtual layer is not activated, the filter driver may allow the original file request 602 to proceed to the base file system (i.e., base layer 612) without modification. Modified file request 608 and virtual merger layer 616 will be discussed more below.

In general, a disk space 610 may be divided into separate storage locations for one or more layers. For example, disc space 610 in FIG. 6 may be divided into base layer 612, virtual layer 614, and virtual merger layer 616. Each of base layer 612, virtual layer 614, and virtual merger layer 616 may be distinct from the others (i.e., data may be independently stored to any of those storage locations). Alternatively, one or more of base layer 612, virtual layer 614, and virtual merger layer 616 may only additionally store data that is distinct or different from data that is already stored in another layer, such as base layer 612. For example, virtual layer 614 may only store data that is unique to virtual layer 614, without additionally storing data that is redundant to data stored in base layer 612.

When a virtual layer is created, creation module 104 may establish rules for file request redirection. For example, creation module 104 may establish rules for modifying file requests so that file requests from one or more processes are redirected from base layer 612 to one or more virtual layers, such as virtual layer 614. Specifically, creation module 104 may establish the rule "add '_VL' to the directory of the file request if the request is from process 'x'." That may be a rule establishing file request redirection for virtual layer 614 shown in FIG. 6. By adding the text "_VL" to the directory of the file request, creation module 104 may ensure that file requests, such as file request 602, are redirected to the appropriate virtual layer for a particular process. The above-discussed rule is merely exemplary, however, and this application contemplates systems and methods that perform file request redirection, and/or any other type of application virtualization, in any suitable manner. For example, the letter of the drive may be modified so that file requests to the "C" drive are redirected to another drive, such as the "D" drive. Similarly, instead of modifying the directory of the file request, creation module 104 may also establish rules for modifying the name of the file itself. For example, the file name "file.txt" may be changed to the form "file_VL.txt." In that case, files of separate layers may be stored within a same directory while being distinguished or identified by their respective naming conventions. Further, registry and other settings may be separately stored in each of the base layer 612, virtual layer 614, and virtual merger layer 616.

Returning to FIG. 4, a user may create a virtual merger layer at step 302 by pressing create merger button 432 in GUI 400. Creation module 104 may create a virtual merger layer in substantially the same way that creation module 104 creates a virtual layer (e.g., when a user presses create button 428). When the virtual merger layer is active, the virtual merger layer may run in a merger process space, such as merger process space 537 shown in FIG. 5. As further shown in FIG. 5, merger process space 537 may be substantially the same as virtual process spaces 502 and 514 as well as base process space 526. As for the creation of virtual layers, creation module 102 may create a virtual merger layer in part by establishing rules for file request redirection that redirect file requests from one or more processes to the virtual merger layer.

As shown in FIG. 6, certain file system calls may be redirected to virtual merger layer 616. For example, FIG. 6 shows that file request 602 may be modified so that the file request no longer refers to c:\folder1\, but rather refers to c:\folder1_VML\, which may be a part of virtual merger layer 616. As discussed below regarding step 308 of FIG. 3, virtual merger layer 616 may only record new data or changes to data, such that virtual merger layer 616 is empty upon creation (e.g., because no new data or changes to data have yet been recorded).

Requests for files (or other data) that are stored prior to the creation and activation of virtual merger layer 616 may be directed to the virtual layer (e.g., virtual layer 614) where the file or data was originally stored. Alternatively, when virtual merger layer 616 is activated, requests for files (or other data) that are stored prior to the creation and activation of virtual merger layer 616 may be directed to virtual merger layer 616, which may fulfill the requests with data from the virtual layer where the data was originally stored (i.e., virtual merger layer 616 may reference data in virtual layers linked to virtual merger layer 616).

When virtual merger layer 616 is activated, virtual merger layer 616 may record changes to data and/or new data that would have been written to a linked virtual layer, such as virtual layer 614, had virtual merger layer 616 not been active. For example, the new version of a file may be stored in virtual merger layer 616 (alternatively, only information indicating the changes to may be stored in virtual merger layer 616). While virtual merger layer 616 is active, subsequent read requests to the file may be answered with the data from virtual merger layer 616 rather than data from linked virtual layer 614. If virtual merger layer 616 is deactivated and virtual layer 614 is activated independent of virtual merger layer 616, read requests to the file may be answered with data from virtual layer 614 rather than virtual merger layer 616.

Returning to FIG. 3, at step 304, one or more of the systems described herein may identify a first virtual layer to be added to the virtual merger layer, the first virtual layer being programmed to execute within a process space of the first virtual layer. For example, identification module 106 may identify a first virtual layer to be added to the virtual merger layer.

Identification module 106 may identify a first virtual layer to be added to the virtual merger layer in a variety of manners. For example, FIG. 4 shows how a user may select one of the virtual layers 404-410 for inclusion within a virtual merger layer. As described above, virtual layer management window 402 may include a complete list of all layers, including virtual layers, present on a computing system, such as computing device 202 or server 206, and available to the user for inclusion within a virtual merger layer. The user may select one of the virtual layers 404-410 by selecting (e.g., clicking with the pointing device) on the respective representation.

As a more specific example, a user may create a virtual merger layer in accordance with step 302 by selecting create merger button 432. Upon selecting create merger button 432, virtual merger layer creation window 438 may appear. Virtual merger layer creation window 438 may include a list of virtual layers for inclusion within the virtual merger layer. For example, FIG. 4 shows that virtual layer 404 and virtual layer 406 have been previously selected for inclusion within the virtual merger layer. The user may select add button 434 to add an additional virtual layer to the virtual merger layer. For example, upon selecting add button 434, the user may select another virtual layer, such as virtual layer 410, for inclusion in the virtual merger layer. The user may select the additional virtual layer by clicking on the virtual layer representation 410 with the pointing device and/or by providing any other suitable input.

After selecting an additional virtual layer, such as virtual layer 410, the representation of that additional virtual layer may appear in the list of virtual layers in virtual layer creation window 438. For example, representation 410 may then appear beneath the virtual layer representations 404 and 406 in virtual merger layer creation window 438. The user may then add more virtual layers for inclusion within the virtual merger layer as desired.

At virtual merger name prompt 440, the user may enter a name for the virtual merger layer. For example, the user may designate the name "virtual merger layer 1" or any other character string (or other name) for the virtual merger layer.

While in the above example identification module 106 identifies a first virtual layer using windows 402 and 438 of GUI 400, identification module 106 may also, or alternatively, identify a virtual layer in a variety of other manners. For example, identification module 106 may receive user input through a GUI that does not feature windows (e.g., a GUI based on mere textual display). Alternatively, or additionally, identification module 106 may identify a virtual layer automatically without user input using one or more of default settings, rules, artificial intelligence, and/or heuristics. For example, identification module 106 may identify a virtual layer using heuristics based on one or more of the following factors: which virtual layers are currently enabled, which virtual layers are most frequently enabled in the past, the relationships between virtual layers (e.g., a virtual layer that includes an application that interacts with an application from another virtual layer may be identified by identification module 106 for inclusion within a virtual merger layer that includes both virtual layers), which virtual layers are enabled together, the performance of virtual layers along one or more performance metrics (so that better performing virtual layers are more likely to be included within a virtual merger layer), the creation dates of the virtual layers (so that more recently created virtual layers are more likely to be included within virtual merger layers) and/or applications that are currently executing (so that virtual layers that include applications that are currently executing are more likely to be included within a virtual merger layer).

As noted, the first virtual layer may be programmed to execute within a process space of the first virtual layer. For example, when the first virtual layer is activated, a file system filter driver may redirect requests from one or more processes to the first virtual layer. Thus, the first virtual layer may be programmed to execute within a process space of the first virtual layer by virtue of settings implemented by the file system filter driver. Various other virtualization technologies and/or techniques may also enable the first virtual layer to execute in its own process space.

Returning to FIG. 3, at step 306 one or more of the systems described herein may identify a second virtual layer to be added to the virtual merger layer, the second virtual layer being programmed to execute within a process space of the second virtual layer. For example, identification module 106 may identify a second virtual layer to be added to the virtual merger layer.

Identification module 106 may identify the second virtual layer to be added to the virtual merger layer at step 306 in a variety of ways. These may include substantially the same way that identification module 106 identifies the first virtual layer to be added to the virtual merger layer at step 304. For example, identification module 106 may identify one or more of the first and second virtual layers based on user input to GUI 400 shown in FIG. 4. Specifically, a user may select the virtual layers from a list of available virtual layers in virtual layer management window 402. Upon selecting the virtual layers, they may appear in virtual merger layer creation window 438.

As also discussed above, identification module 106 may identify the second virtual layer in any other suitable manner, such as by using a different GUI (e.g., one based on merely textual display). Identification module 106 may also identify the second virtual layer automatically without user input based on one or more of the factors discussed above regarding step 304.

The virtual layers identified at steps 304 and 306 may be programmed to execute within their own respective process spaces. That is, the first virtual layer may be programmed to execute within its own process space, and the second virtual layer may be programmed to execute within its own process space that is distinct from the process space of the first virtual layer. Returning to FIG. 5, the first virtual layer may execute within virtual process space 502 and the second virtual layer may execute within virtual process space 514, for example. As shown in FIG. 5, process space 502 and process space 514 may be distinct. For example, a file system filter driver may redirect calls from a first set of processes (e.g., process associated with the first virtual layer) to process space 502 and may redirect calls from a second set of processes (e.g., processes associated with the second virtual layer) to process space 514.

Returning to FIG. 6, the first virtual layer may correspond to virtual layer 614. In that case, the first virtual layer may execute within process space 502 of FIG. 5. Virtualization settings for the first virtual layer may designate file request redirection rules, such as the rule that the directory of the file request should be modified to include "_VL", as shown in FIG. 6. In contrast, the second virtual layer may correspond to an additional virtual layer (not shown in FIG. 6) included within disc space 610. The second virtual layer may execute within process space 514 of FIG. 5. Virtualization settings may designate separate file request redirection rules for redirecting file requests to the second virtual layer.

Returning to FIG. 3, at step 308, one or more of the systems described herein may link the first and second virtual layers to the virtual merger layer such that the first and second virtual layers execute within a process space of the virtual merger layer. For example, linking module 108 may link virtual layer 404 and virtual layer 406 to virtual merger layer 414.

Linking module 108 may link first and second virtual layers to a virtual merger layer in a variety of manners. Linking a virtual layer to a virtual merger layer generally involves any process for associating a virtual layer with a virtual merger layer in a manner that causes the virtual layer to execute with a process space of the virtual merger layer when the virtual merger layer is activated.

As an example of how a virtual layer may be linked to a virtual merger layer, after identification module 106 has identified the first and second virtual layers for inclusion within the virtual merger layer, the user may select done button 436 to thereby link the first and second virtual layers to the virtual merger layer. After the user selects done button 436, the first and second virtual layers may be associated with the virtual merger layer so that activation of the virtual merger layer automatically activates the first and second virtual layers and causes the first and second virtual layers to execute within the process space of the virtual merger layer.

Linking module 108 may link the first and second virtual layers to the virtual merger layer in part by modifying virtualization settings to redirect file system calls to the virtual merger layer. For example, file system calls that would be directed to the first and second virtual layers (i.e., the layers linked to the virtual layers) when the virtual merger layer is inactive would be redirected to the first and second virtual merger layers when they are active. In various embodiments, when the virtual merger layer is active, a file system filter driver may view the first and second virtual layers as executing within the same process space (i.e., the process space of the virtual merger layer).

In some embodiments, linking module 108 may link the first and second virtual layers to the virtual merger layer such that all file system calls that would have been directed to the first and second virtual layers are directed to the virtual merger layer when the virtual merger layer is activated. In such embodiments, when the virtual merger layer is activated, changes to data and new data may be written to the virtual merger layer, while attempts to read data that existed in the linked virtual layers before activation of the virtual merger layer may pass through the virtual merger layer to data in the linked virtual layers.

In other embodiments, linking module 108 may link the first and second virtual layers to the virtual merger layer such that file requests are redirected to the first and second virtual layers for the purposes of reading files and data stored prior activation of the virtual merger layer, but may be redirected to virtual merger layer 616 for the purposes of creating or modifying files or data. Thus, if file request 602 is a request to read a file stored in a virtual layer prior to the linking of that virtual layer to a virtual merger layer and activation of the virtual merger layer, then file request 602 may be modified in the form of file request 606, and thereby redirected to the original virtual layer 614 (e.g., the first virtual layer). In contrast, if file request 602 is a request to create or modify data, then file request 602 may be modified in the form of file request 608, and thereby redirected to virtual merger layer 616. In summary, when the virtual merger layer is active, read requests to preexisting files and/or settings (i.e., files and/or settings present in a virtual layer before the virtual layer is linked to a virtual merger layer and the virtual merger layer is activated) may be directed to the first and second virtual layers, but the creation and modification of files and/or settings may be performed in the virtual merger layer (e.g., in a separate and unique portion of disc space for the virtual merger layer).

As noted, a virtual merger layer may enable two or more distinct virtual layers to execute within the same process space (i.e., the process space of the virtual merger layer). Thus, applications installed in different virtual layers that are linked to a virtual layer may interact within the same process space when the virtual layer is active. Administrators may therefore be able to reap the advantages of installing applications to distinct virtual layers (i.e., avoiding conflicts) while also being able to activate a virtual merger layer to run the applications in the same process space when desired. Furthermore, by linking virtual layers to a virtual merger layer, a user may enable multiple virtual layers without storing changes or modifications to either one of, or both of, those virtual layers. Rather, the changes or modifications may be stored to the separate space of the virtual merger layer, thereby allowing the user to toggle between the state of an application as captured in the virtual merger layer (e.g., by activating the virtual merger layer) and the state of an application in its own virtual layer (e.g., by deactivating the virtual merger layer and activating the application's virtual layer).

Figure 7:
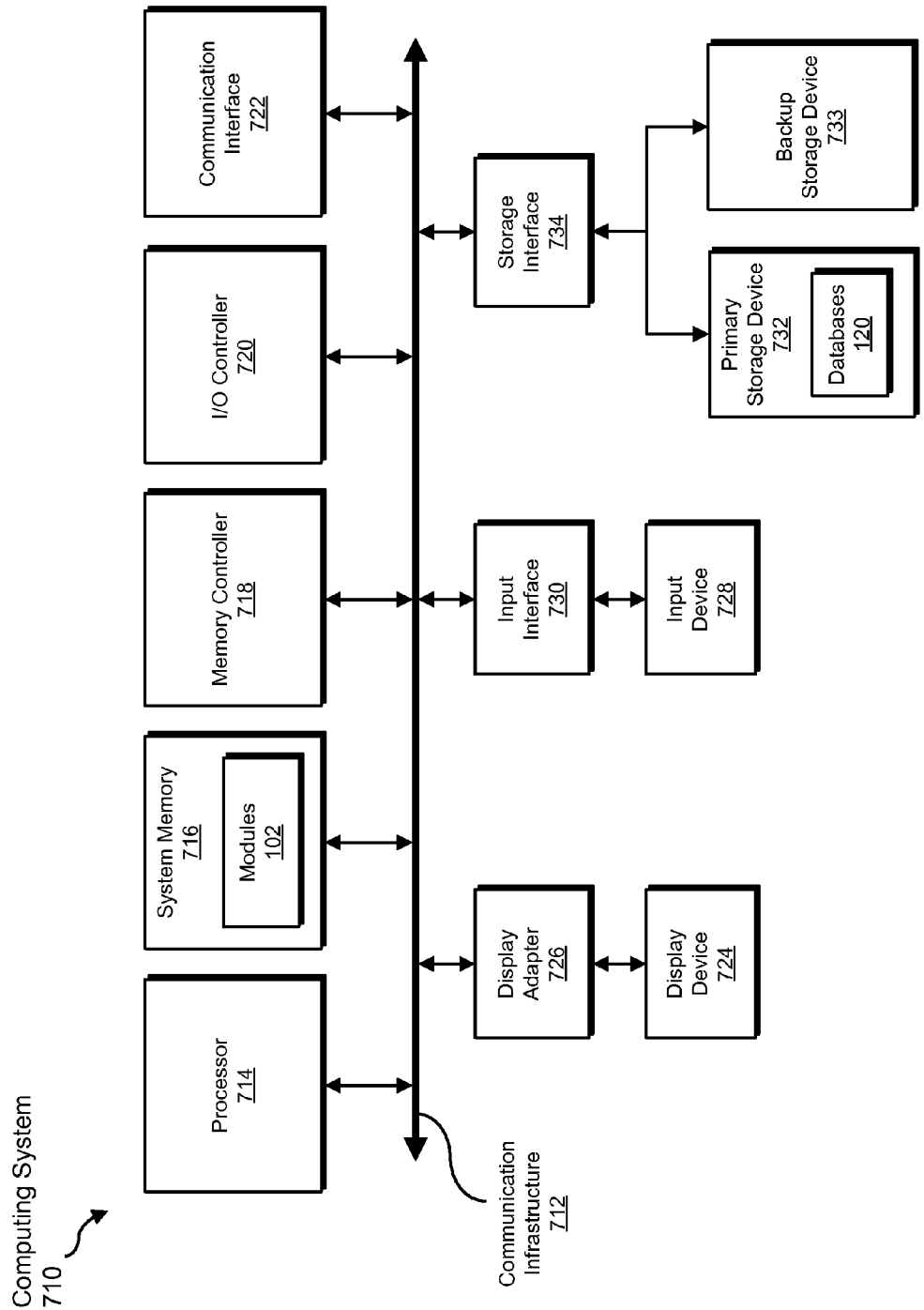
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the creating, identifying, linking, activating, redirecting, applying, writing, controlling, enabling, retaining, and/or remaining steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as creating, identifying, linking, activating, redirecting, applying, writing, controlling, enabling, retaining, and/or remaining.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the creating, identifying, linking, activating, redirecting, applying, writing, controlling, enabling, retaining, and/or remaining steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the creating, identifying, linking, activating, redirecting, applying, writing, controlling, enabling, retaining, and/or remaining steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the creating, identifying, linking, activating, redirecting, applying, writing, controlling, enabling, retaining, and/or remaining steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the creating, identifying, linking, activating, redirecting, applying, writing, controlling, enabling, retaining, and/or remaining steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
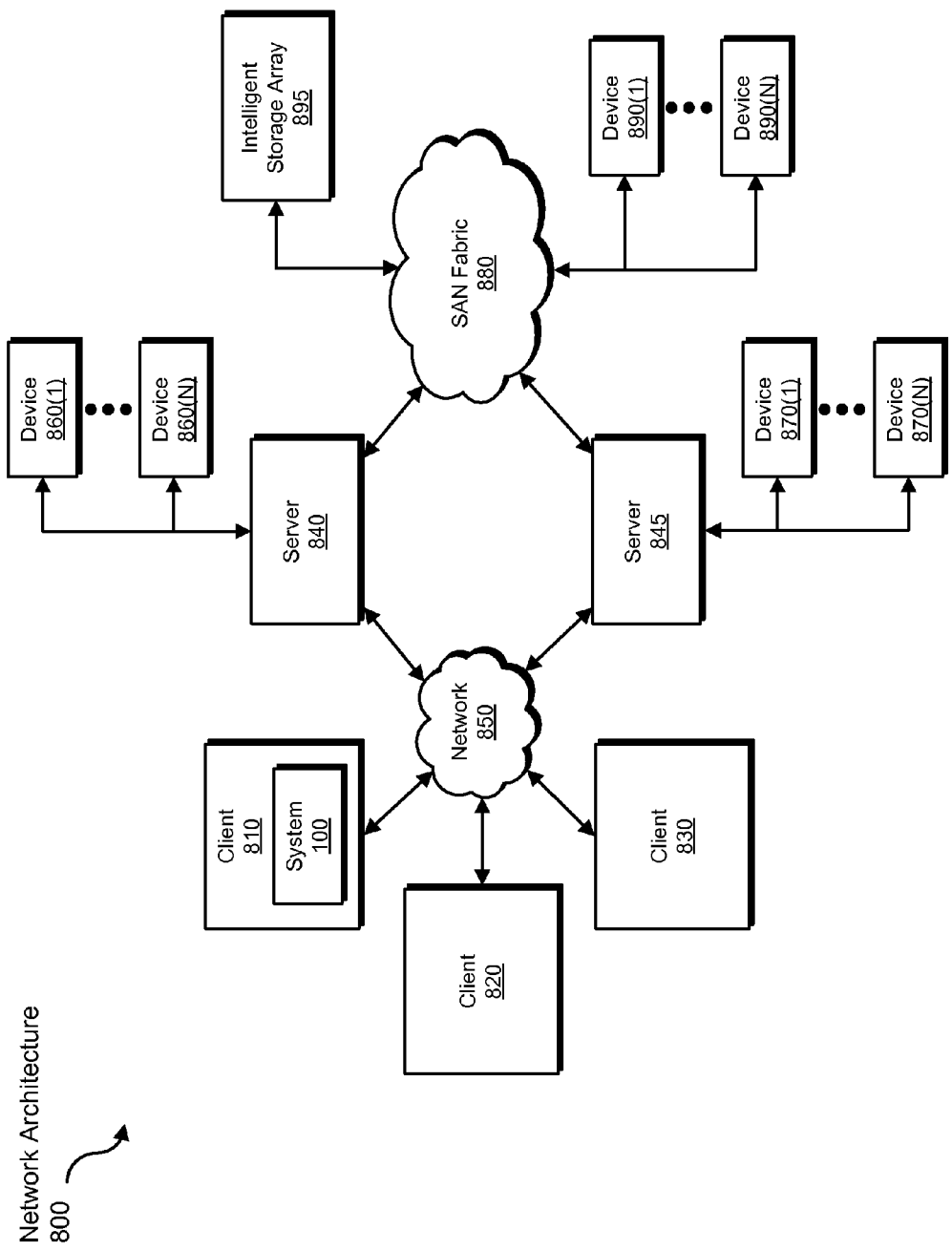
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the creating, identifying, linking, activating, redirecting, applying, writing, controlling, enabling, retaining, and/or remaining steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for merging virtual layers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, linking module 108 may transform virtual layer data 122 and/or virtual merger layer data 124 so that virtual layers are linked to a virtual merger layer, as discussed above. Linking module 108 may also receive user input to determine which virtual layers to link to the virtual merger layer, and present output indicating the result of the linking, as also discussed above (e.g. regarding FIG. 4).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for merging virtual layers, at least a portion of the method being performed by a computing device comprising at least one processor, the method comprising:
   identifying a first virtual layer, the first virtual layer being programmed to execute within a process space of the first virtual layer;
   identifying a second virtual layer, the second virtual layer being programmed to execute within a process space of the second virtual layer that is distinct from the process space of the first virtual layer;
   receiving a command, through a user interface, to create a virtual merger layer, the virtual merger layer being programmed to execute within a process space of the virtual merger layer that is distinct from the process space of the first and second virtual layers;
   linking the first and second virtual layers to the virtual merger layer such that when the virtual merger layer is activated, the first and second virtual layers execute within the process space of the virtual merger layer, the linking being performed at least in part by:
      presenting, through the user interface, the first virtual layer and the second virtual layer as options for including within the virtual merger layer;
      specifying, through the user interface, the first virtual layer and the second virtual layer, from among a set of virtual layers, as virtual layers to be included within the virtual merger layer;
      executing the command to create the virtual merger layer, according to the specifying of the first virtual layer and the second virtual layer, such that the first virtual layer and the second virtual layer execute within the process space of the virtual merger layer when the virtual merger layer is activated.

2. The computer-implemented method of claim 1, wherein the user interface comprises a graphical user interface.

3. The computer-implemented method of claim 1, further comprising: activating the virtual merger layer, wherein activation of the virtual merger layer triggers activation of the first and second virtual layers.

4. The computer-implemented method of claim 3, further comprising:
   identifying an attempt to change a file or setting stored in the first virtual layer while the virtual merger layer is active;
   applying the change to the file or setting in the virtual merger layer instead of the first virtual layer.

5. The computer-implemented method of claim 3, further comprising:
   identifying an attempt to write a new file or setting to the first virtual layer while the virtual merger layer is active;
   writing the new file or setting to the virtual merger layer instead of the first virtual layer.

6. The computer-implemented method of claim 2, wherein the graphical user interface comprises a button for a user to click to create the virtual merger layer.

7. The computer-implemented method of claim 2, wherein the graphical user interface enables a user to toggle the activation of the first virtual layer, the second virtual layer, and the virtual merger layer.

8. The computer-implemented method of claim 1, wherein:
   the first and second virtual layers and the virtual merger layer are stored on a computing system within an operating system environment of the computing system;
   the operating system environment of the computing system comprises a process space that is distinct from the process space of the first virtual layer, the process space of the second virtual layer, and the process space of the virtual merger layer.

9. The computer-implemented method of claim 1, wherein:
when the first and second virtual layers are linked to the virtual merger layer:
files or settings stored in the first and second virtual layers are retained in the first and second virtual layers;
the virtual merger layer remains empty.

10. A system for merging virtual layers, comprising:
an identification module programmed to:
identify a first virtual layer, the first virtual layer being programmed to execute within a process space of the first virtual layer;
identify a second virtual layer, the second virtual layer being programmed to execute within a process space of the second virtual layer that is distinct from the process space of the first virtual layer;
a creation module programmed to receive a command, through a user interface, to create a virtual merger layer, the virtual merger layer being programmed to execute within a process space of the virtual merger layer that is distinct from the process space of the first and second virtual layers;
a linking module programmed to link the first and second virtual layers to the virtual merger layer such that when the virtual merger layer is activated, the first and second virtual layers execute within the process space of the virtual merger layer, the linking being performed at least in part by:
presenting, through the user interface, the first virtual layer and the second virtual layer as options for including within the virtual merger layer;
specifying, through the user interface, the first virtual layer and the second virtual layer, from among a set of virtual layers, as virtual layers to be included within the virtual merger layer;
executing the command to create the virtual merger layer, according to the specifying of the first virtual layer and the second virtual layer, such that the first virtual layer and the second virtual layer execute within the process space of the virtual merger layer when the virtual merger layer is activated;
one or more processors configured to execute at least one of the creation module, the identification module, and the linking module.

11. The system of claim 10, further comprising a redirection module programmed to:
when the virtual merger layer is not activated:
redirect a first file access request to the first virtual layer;
redirect a second file access request to the second virtual layer;
when the virtual merger layer is activated:
redirect the first file access request to the virtual merger layer;
redirect the second file access request to the virtual merger layer.

12. The system of claim 10, further comprising an activation module programmed to activate the virtual merger layer.

13. The system of claim 12, further comprising:
a redirection module programmed to:
identify an attempt to change a file or setting stored in the first virtual layer while the virtual merger layer is active;
apply the change to the file or setting in the virtual merger layer instead of the first virtual layer.

14. The system of claim 12, further comprising:
a redirection module programmed to:
identify an attempt to write a new file or setting to the first virtual layer while the virtual merger layer is active;
redirect the attempt to write the new file or setting to the virtual merger layer instead of the first virtual layer.

15. The system of claim 10, wherein the process space of the first virtual layer is independent of, and can be controlled separately from, the process space of the second virtual layer.

16. The system of claim 10, wherein:
the first virtual layer comprises files and/or settings of a first application installed to the first virtual layer;
the second virtual layer comprises files and/or settings of a second application installed to the second virtual layer;
the virtual merger layer enables interaction between the first and second applications within the process space of the virtual merger layer.

17. The system of claim 10, wherein:
the first and second virtual layers and the virtual merger layer are stored on a computing system within an operating system environment of the computing system;
the operating system environment of the computing system comprises a process space that is distinct from the process space of the first virtual layer, the process space of the second virtual layer, and the process space of the virtual merger layer.

18. The system of claim 10, wherein:
when the first and second virtual layers are linked to the virtual merger layer:
files or settings stored in the first and second virtual layers are retained in the first and second virtual layers;
the virtual merger layer remains empty.

19. A non-transitory computer-readable-storage medium comprising one or more computer-executable instructions that, when executed by at least one processor of a computing device, cause the computing device to:
identify a first virtual layer, the first virtual layer being programmed to execute within a process space of the first virtual layer;
identify a second virtual layer, the second virtual layer being programmed to execute within a process space of the second virtual layer that is distinct from the process space of the first virtual layer;
receive a command, through a user interface, to create a virtual merger layer, the virtual merger layer being programmed to execute in a process space that is distinct from the process space of the first and second virtual layers;
link the first and second virtual layers to the virtual merger layer such that when the virtual merger layer is activated, the first and second virtual layers execute within the process space of the virtual merger layer, the linking being performed at least in part by:
presenting, through the user interface, the first virtual layer and the second virtual layer as options for including within the virtual merger layer;
specifying, through the user interface, the first virtual layer and the second virtual layer, from among a set of virtual layers, as virtual layers to be included within the virtual merger layer;
executing the command to create the virtual merger layer, according to the specifying of the first virtual layer and the second virtual layer, such that the first virtual layer and the second virtual layer execute within the process space of the virtual merger layer when the virtual merger layer is activated.

20. The non-transitory computer-readable-storage medium of claim 19, wherein the one or more computer-executable instructions, when executed by the at least one processor of the computing device, further cause the computing device to:
when the virtual merger layer is not activated:
redirect a first file access request to the first virtual layer;
redirect a second file access request to the second virtual layer;
when the virtual merger layer is activated:
redirect the first file access request to the virtual merger layer;
redirect the second file access request to the virtual merger layer.

* * * * *